United States Patent [19]
Noddin et al.

[11] 3,780,752
[45] Dec. 25, 1973

[54] EXPLOSIVELY ACTUATED VALVE

[75] Inventors: Kenneth W. Noddin, Wenonah, N.J.; Walter J. Simmons, Falling Waters, W. Va.

[73] Assignee: E. I. du Pont de Nemours and Company, Wilmington, Del.

[22] Filed: Mar. 1, 1971

[21] Appl. No.: 119,645

[52] U.S. Cl............................ 137/68, 220/47, 222/3
[51] Int. Cl.............................................. F16k 17/40
[58] Field of Search................. 137/67, 71; 220/47, 220/89 A; 222/3, 5; 280/150 AB

[56] References Cited
UNITED STATES PATENTS

| | | | |
|---|---|---|---|
| 2,966,163 | 12/1960 | Nylin | 220/47 X |
| 2,972,998 | 2/1961 | Detwiler | 220/47 X |
| 3,670,925 | 6/1972 | Moyant | 222/3 |
| 2,797,760 | 7/1957 | Mathisen | 169/9 |
| 3,196,610 | 7/1965 | Anderson | 137/68 X |
| 3,264,079 | 8/1966 | McKelvey | 65/114 X |
| 3,332,311 | 7/1967 | Schulz | 85/65 |
| 3,395,825 | 8/1968 | Cottrell | 220/47 |

FOREIGN PATENTS OR APPLICATIONS

| 772,673 | 4/1957 | Great Britain | 137/68 |
|---|---|---|---|

*Primary Examiner*—Martin P. Schwadron
*Assistant Examiner*—Richard Gerard
*Attorney*—Samuel S. Blight

[57] ABSTRACT

An explosively actuated valve sealed by a frangible diaphragm, e.g., tempered glass, which is opened with an expandable electroexplosive device which fractures the frangible diaphragm. The frangible diaphragm can be used in combination with a rupture disk.

4 Claims, 4 Drawing Figures

PATENTED DEC 25 1973 3,780,752
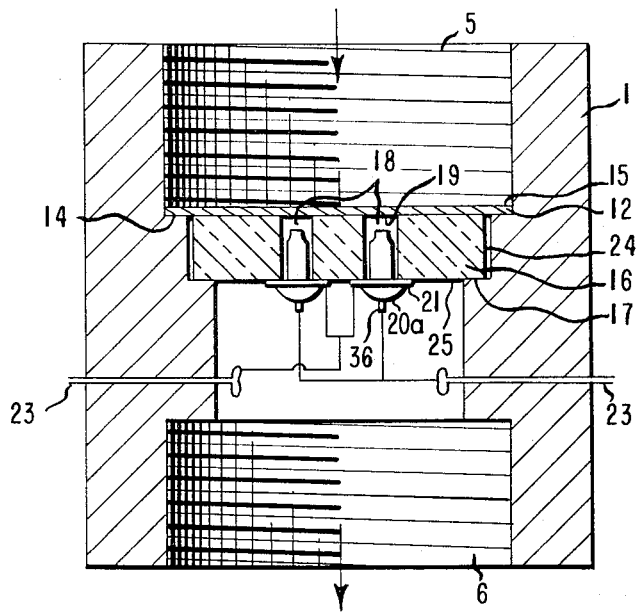
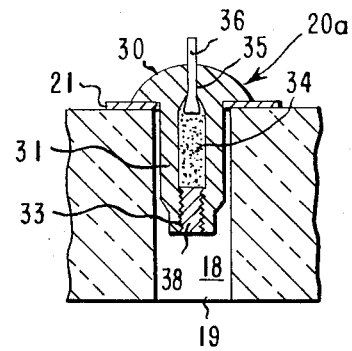
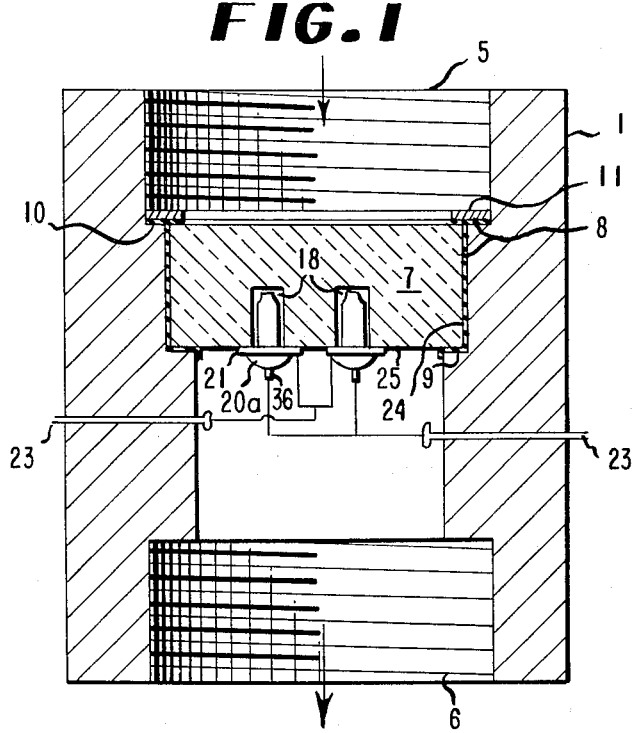
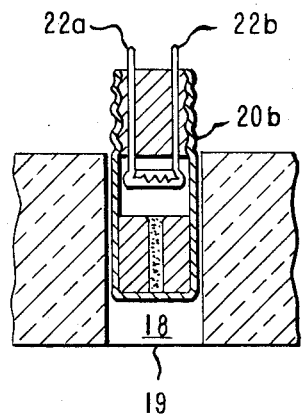
INVENTORS
KENNETH W. NODDIN
WALTER J. SIMMONS
BY *Samuel S. Blight*
ATTORNEY

EXPLOSIVELY ACTUATED VALVE

SUMMARY OF THE INVENTION

The valve of this invention is normally closed and comprises a body having a passage therethrough which passage provides an inlet and an outlet for fluid under pressure. The inlet is connected to a source of fluid, e.g. an air tank, and the outlet is connected to a receiving means. A diaphragm constructed of a frangible material closes the passage to the movement of fluid by itself or can support a bursting or rupture disk which closes the passage.

The frangible diaphragm is adapted to retain an explosively operated expansion means, e.g., a ductile metal container holding an explosive charge. When the explosive is ignited the expansion means fractures the frangible diaphragm by expanding in contact therewith and the passage is opened. In the embodiment wherein the frangible diaphragm supports a rupture disk and the diaphragm is fractured, the disk ruptures from the pressure of the fluid thereby discharging the fluid.

DETAILED DESCRIPTION OF THE INVENTION

For a more complete understanding of the present invention, reference is made to the drawings accompanying and made a part of this specification in which FIGS. 1 and 2 are cross-sectional elevations of valves of this invention. FIG. 3 is an enlarged section of the expansion device shown in FIGS. 1 and 2. FIG. 4 is an enlarged section of an alternate expansion device.

Referring now to the drawings, it should be noted that similar structural elements in all figures are numbered similarly. The valve body 1 is constructed of suitable material, e.g. a metal and is preferably cylindrical in shape having a circular cross-section in a plane perpendicular to that of FIG. 1 or FIG. 2. The direction of flow of fluid through the valve is shown by arrows. Inlet aperture 5 (threaded) is connected by suitable piping, tubing, etc. (not shown) to a container of fluid under pressure. The outlet aperture 6 is connected to a suitable receiving means such as a rapid-acting air cylinder, the expansible gas bag of a body motion-arresting device, a collapsible life raft, or a liquid distribution system, e.g., a fire extinguisher, by techniques known to those skilled in the art.

In FIG. 1 the passage between the inlet and outlet is closed by frangible diaphragm 7 formed from any frangible material which is impervious to the fluid. Suitable materials include brittle cast metals, ceramics and glass. Tempered glass is especially preferred because it is corrosion resistant and can shatter to a fine powder. A seal between the valve body 1 and diaphragm 7 is provided by gasket 8 made from an elastomer which contacts the supporting shoulder 9 and the secondary shoulder 10. The diaphragm 7 is retained by the pressure of a threaded male connection bearing against washer 11 which in turn compresses gasket 8 and forces it into sealing engagement with the adjacent portions of the valve body 1 and diaphragm 7.

In FIG. 2 the passage between the inlet and the outlet of the valve is closed by a bursting or rupture disk 12. Disk 12 is made of any metal or alloy that is preferably corrosion and deterioration resistant, for example, brass, stainless steel, Inconel, aluminum, mild steel or similar metals. The disk can contain score-lines or other structural features that intensify stress and direct rupture of the disk from its center outwardly to the periphery of the disk at its junction with the valve body. Disk 12 is retained by the pressure of a threaded male connection in aperture 5 which forces the periphery of disk 12 to tight engagement with lip 14 in the valve body. Alternately disk 12 can be metallurgically bonded to valve body 1 by a continuous bead of solder or welding metal placed at location 15. Alternate designs of rupture disks are apparent to those skilled in the art. Disk 12 is supported additionally and prevented from rupturing by a frangible disk 16 which in turn is supported by shoulder 17. Disk 16 is constructed of any frangible material and preferably of a ceramic or glass. As in the embodiment illustrated in FIG. 1, tempered glass is especially preferred because it can shatter to a fine powder. In this embodiment, disk 16 need not be impervious to the fluid.

Frangible disks 7 and 16 contain one or more chambers 18 which in the embodiment set forth in FIG. 2 can extend through or partially through disk 16. If the chambers 18 extend through disk 16 the unsupported areas 19 must be insufficient to permit the disk 12 to rupture in the unsupported areas. The chamber 18 is of sufficient diameter and depth to receive an electroexplosive expansion device 20a or 20b (see also FIGS. 3 and 4). Such expansion devices are disclosed and described in U.S. Pat. Nos. 3,332,311 issued to W. E. Shultz on Jan. 25, 1967 and 3,102,474 issued to R. J. Miller et al. on Sept. 3, 1963. Non-rupturing expansion devices are preferred because devices which rupture are noisy and tend to fragment. Mechanical means, e.g., a percussion activated primer can be employed instead of the electrically activated device illustrated. With reference to FIG. 3, the expansion device is an explosive rivet comprising a rivet body having a head portion 30 and shank portion 31 of conductive material and a central longitudinal recess or cavity 33. The shank portion contains a semi-conductive explosive mixture 34, e.g., lead azide and graphite. An opening 35 extends axially through the head portion into recess 33. A conductor 36 extends into recess 33 through opening 35. The conductor is insulated throughout its entire length by a flexible coating of resin about 1 mil thick which is not affected by voltages of up to 500 volts. The recess of the rivet is closed by a cylindrical plug 38. The outer end of the shank is swaged to lock plug 38 into position.

Expansion devices 20a and 20b fit snugly in chamber 18 in disks 7 and 16 with a permissible clearance of 0.0005–0.04 inch and can be held in place with a thin layer of cement, e.g., epoxy or nitrocellulose adhesive. The conductor 36 is attached to one electrical terminal, and the second electrical terminal is attached to the starred metal washer 21 which engages the head 30 of the rivet and frangible disks 7 and 16. The expansion device illustrated in FIG. 4 has dual electrical terminals 22a and 22b and does not require a supplemental means (washer 21) to complete the electrical circuit. Except for the starred washer, the explosive device of FIG. 4 is maintained within frangible disks 7 and 16 in the same manner as the rivet of FIG. 3. The electrical terminals are attached to a suitable power source via bus bars 23 in the body of the valve. As an alternate to the illustrated arrangement, the explosive device or devices can be retained between the edge 24 of disks 7 and 16 and the valve body 1 and thereby expand in contact with the edge of the disk or the explosive device can be retained in contact with the downstream surface 25 of disks 7 and 16. In the latter arrangement, the force generated by the substantially unrestrained expansion can be sufficient to fracture the frangible disks although a larger explosive charge may be required. Although a single expansion device is adequate to fracture the frangible disks, the certainty that the valve will function is increased by the inclusion of more than one explosive device.

In the illustrated embodiment, the valve is opened by applying an electrical impulse to the electroexplosive expansion devices 20a and 20b through a circuit which includes conductor 23 and washer 21 or terminals 22a and 22b. The charge within the expansion device is ignited and explodes almost instantaneously thereby expanding the outer diameter of the body of the device within frangible disks 7 and 16 at least 10–30 percent and, preferably, without rupturing the device. The time of expansion after application of the firing impulse is on the order of 1 to 100 microseconds. The expansion device 20 introduces a shock into frangible plates 7 and 16 and fractures them. The passage is opened by fracture of the frangible member 7 in the valve illustrated in FIG. 1 whereas in the valve illustrated in FIG. 2 support for bursting disk 15 is removed upon fracture of the frangible diaphragm 16, and the bursting disk is ruptured by the pressure of fluid on its inlet side thereby opening a substantially unimpeded path for the flow of fluid from the reservoir to the receiving means.

Reuse of the valve requires removal of any residual fragments of the used assembly and replacement of diaphragms 7 and 16 and rupture disk 15 along with electroexplosive devices 20a and 20b by corresponding unused units and connection of the electrical circuits.

It will be apparent that a valve of this invention can be employed to release a fluid under pressure in any location or arrangement of equipment that can provide or generate the required initiating energy. Thus, the valve can function to release spray liquids from reservoirs carried by an airplane or to jetison fuel from tanks of aircraft. The valve can be used to inflate flotation gear in the ocean and be initiated electrically where the current is supplied by a sea water-cell that is activated upon contact with the water. The valve can be opened by application of electrical current from a small battery in a circuit that is made by closure of an impact-activated switch that closes in case of collision of two or more vehicles or by impact of a vehicle with a fixed object, or by impact of an object, e.g., a life raft, dropped into a body of water. If delayed action electro-expansion devices of the general type of device 20b are employed, opening of a valve of the invention can be delayed for desired preselected periods of time.

The valve requires no rotatable valve members, for example, sleeves or gates, with the resultant elimination of the problems associated therewith. The explosive expanding element minimizes the danger inherent in explosive devices and particularly because, in the preferred embodiment, the device is nonrupturing and its actuation involves no metallic fragmentation. The valve provides a hermetically tight closure that can be opened positively and practically instantly to provide a substantially uninhibited exit passage for fluid under pressure.

We claim:

1. An explosively actuated valve comprising a body with a passage therethrough which passage provides an inlet and outlet for fluid under pressure, a diaphragm closing said passage to the movement of fluid which is normally rupturable by the pressure of said fluid, a frangible support means positioned on the outlet side of said diaphragm to prevent rupture of said diaphragm, said frangible support means adapted to retain at least one explosively actuated nonrupturing expansion means, said expansion means being actuated by an electrical impulse and arranged to expand in contact with said frangible support means whereby said support means is fractured and fails to support said diaphragm.

2. The valve of claim 1 wherein the material of construction for the frangible support means is tempered glass.

3. The valve of claim 2 wherein the expansion means comprises an explosive rivet retained in said frangible support means.

4. An explosively actuated valve comprising a body with a passage therethrough which passage provides an inlet and outlet for fluid under pressure, a diaphragm of tempered glass closing said passage to the movement of fluid, at least one explosive rivet arranged to expand in contact with said diaphragm whereby said diaphragm is fractured and said passage is opened.

* * * * *